(12) United States Patent
Gulati et al.

(10) Patent No.: US 11,924,796 B2
(45) Date of Patent: Mar. 5, 2024

(54) REFERENCE TIMING DETERMINATION BASED ON SIDELINK PROPAGATION DELAY

(71) Applicant: QUALCOMM Incorporated, San Diego, CA (US)

(72) Inventors: Kapil Gulati, Belle Mead, NJ (US); Navid Abedini, Basking Ridge, NJ (US); Junyi Li, Fairless Hills, PA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 17/814,177

(22) Filed: Jul. 21, 2022

(65) Prior Publication Data

US 2022/0361131 A1 Nov. 10, 2022

Related U.S. Application Data

(62) Division of application No. 16/939,760, filed on Jul. 27, 2020, now Pat. No. 11,432,255.

(60) Provisional application No. 62/887,466, filed on Aug. 15, 2019.

(51) Int. Cl.
*H04W 76/14* (2018.01)
*H04W 56/00* (2009.01)
*H04W 76/10* (2018.01)

(52) U.S. Cl.
CPC ....... *H04W 56/0095* (2013.01); *H04W 76/10* (2018.02)

(58) Field of Classification Search
CPC ............. H04W 56/0095; H04W 76/10; H04W 72/042; H04W 72/0446; H04W 24/10; H04L 5/001; H04L 5/0048
See application file for complete search history.

(56) References Cited

U.S. PATENT DOCUMENTS

| 2017/0041891 | A1 | 2/2017 | Chae et al. | |
| 2019/0053305 | A1* | 2/2019 | Saiwai | H04W 76/11 |
| 2021/0051619 | A1 | 2/2021 | Gulati et al. | |

OTHER PUBLICATIONS

International Search Report and Written Opinion—PCT/US2020/043905—ISA/EPO—dated Nov. 9, 2020.
NEC: "Synchronization Mechanism for NR Sidelink", 3GPP Draft, 3GPP TSG RAN WG1 #97, R1-1906393 Synchronization Mechanism for NR Sidelink, 3rd Generation Partnership Project (3GPP), Mobile Competence Centre, 650, Route Des Lucioles, F-06921 Sophia-Antipolis Cedex, Franc, vol. RAN WG1, No. Reno, USA, May 13, 2019-May 17, 2019 May 13, 2019 (May 13, 2019), XP051727843, pp. 1-6, Retrieved from the Internet: URL:http://www.3gpp.org/ftp/Meetings%5F3GPP%5FSYNC/RAN1/Docs/R1%2D1906393%2Ezip [retrieved on May 13, 2019].

* cited by examiner

*Primary Examiner* — Jamal Javaid
(74) *Attorney, Agent, or Firm* — Muncy, Geissler, Olds & Lowe, P.C./Qualcomm

(57) ABSTRACT

In an embodiment, a UE establishes, with a peer sidelink UE, at least one sidelink communications link that each comprises one or more hops. The UE determines estimates a propagation delay between the UE and the peer sidelink UE based in part upon a relationship between a propagation time, between the UE and the peer sidelink UE, and Reference Signal Received Power (RSRP) irrespective of whether the UE remains synchronized with respect to the network clock.

24 Claims, 13 Drawing Sheets

REFERENCE TIMING DETERMINATION BASED ON SIDELINK PROPAGATION DELAY

CROSS-REFERENCE TO RELATED APPLICATION

The present Application for Patent is a Continuation of U.S. Non-Provisional application Ser. No. 16/939,760, entitled "REFERENCE TIMING DETERMINATION BASED ON SIDELINK PROPAGATION DELAY", filed Jul. 27, 2020, which in claims the benefit of U.S. Provisional Application No. 62/887,466, entitled "REFERENCE TIMING DETERMINATION BASED ON SIDELINK PROPAGATION DELAY", filed Aug. 15, 2019, each of which is assigned to the assignee hereof and hereby expressly incorporated by reference herein in its entirety.

TECHNICAL FIELD

Various aspects described herein generally relate to reference timing determination based on sidelink propagation delay.

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

Some wireless communication networks, such as 5G, support operation at very high and even extremely-high frequency (EHF) bands, such as millimeter wave (mmW) frequency bands (generally, wavelengths of 1mm to 10 mm, or 30 to 300 GHz). These extremely high frequencies may support very high throughput such as up to six gigabits per second (Gbps). One of the challenges for wireless communication at very high or extremely high frequencies, however, is that a significant propagation loss may occur due to the high frequency. As the frequency increases, the wavelength may decrease, and the propagation loss may increase as well. At mmW frequency bands, the propagation loss may be severe. For example, the propagation loss may be on the order of 22 to 27 dB, relative to that observed in either the 2.4 GHz, or 5 GHz bands.

SUMMARY

An embodiment is directed to a method of operating a user equipment (UE), comprising establishing, with a peer sidelink UE, at least one sidelink communications link that each comprises one or more hops, estimating, while the UE is synchronized with respect to a network clock, a propagation delay between the UE and the peer sidelink UE based in part upon a relationship between a propagation time, between the UE and the peer sidelink UE, and Reference Signal Received Power (RSRP), and determining, while the UE is synchronized with respect to the network clock, a reference timing based on the estimated propagation delay.

Another embodiment is directed to a method of operating a user equipment (UE), comprising establishing, with a peer sidelink UE, at least one sidelink communications link that each comprises one or more hops, estimating, while the UE is unsynchronized with respect to a network clock, a propagation delay between the UE and the peer sidelink UE based in part upon a relationship between a propagation time, between the UE and the peer sidelink UE, and Reference Signal Received Power (RSRP), and determining, while the UE is unsynchronized with respect to the network clock, a reference timing based on the estimated propagation delay.

Another embodiment is directed to a user equipment (UE), comprising means for establishing, with a peer sidelink UE, at least one sidelink communications link that each comprises one or more hops, means for estimating, while the UE is synchronized with respect to a network clock, a propagation delay between the UE and the peer sidelink UE based in part upon a relationship between a propagation time, between the UE and the peer sidelink UE, and Reference Signal Received Power (RSRP), and means for determining, while the UE is synchronized with respect to the network clock, a reference timing based on the estimated propagation delay.

Another embodiment is directed to a user equipment (UE), comprising means for establishing, with a peer sidelink UE, at least one sidelink communications link that each comprises one or more hops, means for means for estimating, while the UE is unsynchronized with respect to a network clock, a propagation delay between the UE and the peer sidelink UE based in part upon a relationship between a propagation time, between the UE and the peer sidelink UE, and Reference Signal Received Power (RSRP), and means for determining, while the UE is unsynchronized with respect to the network clock, a reference timing based on the estimated propagation delay.

Another embodiment is directed to a user equipment (UE), comprising a memory, at least one transceiver, and at least one processor coupled to the memory and the at least the transceiver, the at least one processor configured to establish, with a peer sidelink UE, at least one sidelink communications link that each comprises one or more hops, estimate, while the UE is synchronized with respect to a network clock, a propagation delay between the UE and the peer sidelink UE based in part upon a relationship between a propagation time, between the UE and the peer sidelink UE, and Reference Signal Received Power (RSRP), and determine, while the UE is synchronized with respect to the network clock, a reference timing based on the estimated propagation delay.

Another embodiment is directed to a user equipment (UE), comprising a memory, at least one transceiver, and at least one processor coupled to the memory and the at least the transceiver, the at least one processor configured to establish, with a peer sidelink UE, at least one sidelink communications link that each comprises one or more hops, estimate, while the UE is unsynchronized with respect to a network clock, a propagation delay between the UE and the peer sidelink UE based in part upon a relationship between a propagation time, between the UE and the peer sidelink UE, and Reference Signal Received Power (RSRP), and determine, while the UE is unsynchronized with respect to the network clock, a reference timing based on the estimated propagation delay.

Another embodiment is directed to a non-transitory computer-readable medium containing instructions stored thereon, which, when executed by a user equipment (UE), cause the UE to perform actions, the instructions comprising at least one instruction configured to cause the UE to establish, with a peer sidelink UE, at least one sidelink communications link that each comprises one or more hops, at least one instruction configured to cause the UE to estimate, while the UE is synchronized with respect to a network clock, a propagation delay between the UE and the peer sidelink UE based in part upon a relationship between a propagation time, between the UE and the peer sidelink UE, and Reference Signal Received Power (RSRP), and at least one instruction configured to cause the UE to determine, while the UE is synchronized with respect to the network clock, a reference timing based on the estimated propagation delay.

Another embodiment is directed to a non-transitory computer-readable medium containing instructions stored thereon, which, when executed by a user equipment (UE), cause the UE to perform actions, the instructions comprising at least one instruction configured to cause the UE to establish, with a peer sidelink UE, at least one sidelink communications link that each comprises one or more hops, at least one instruction configured to cause the UE to estimate, while the UE is unsynchronized with respect to a network clock, a propagation delay between the UE and the peer sidelink UE based in part upon a relationship between a propagation time, between the UE and the peer sidelink UE, and Reference Signal Received Power (RSRP), and at least one instruction configured to cause the UE to determine, while the UE is unsynchronized with respect to the network clock, a reference timing based on the estimated propagation delay.

BRIEF DESCRIPTION OF THE DRAWINGS

A more complete appreciation of the various aspects described herein and many attendant advantages thereof will be readily obtained as the same becomes better understood by reference to the following detailed description when considered in connection with the accompanying drawings which are presented solely for illustration and not limitation, and in which.

DETAILED DESCRIPTION

Figure 1:
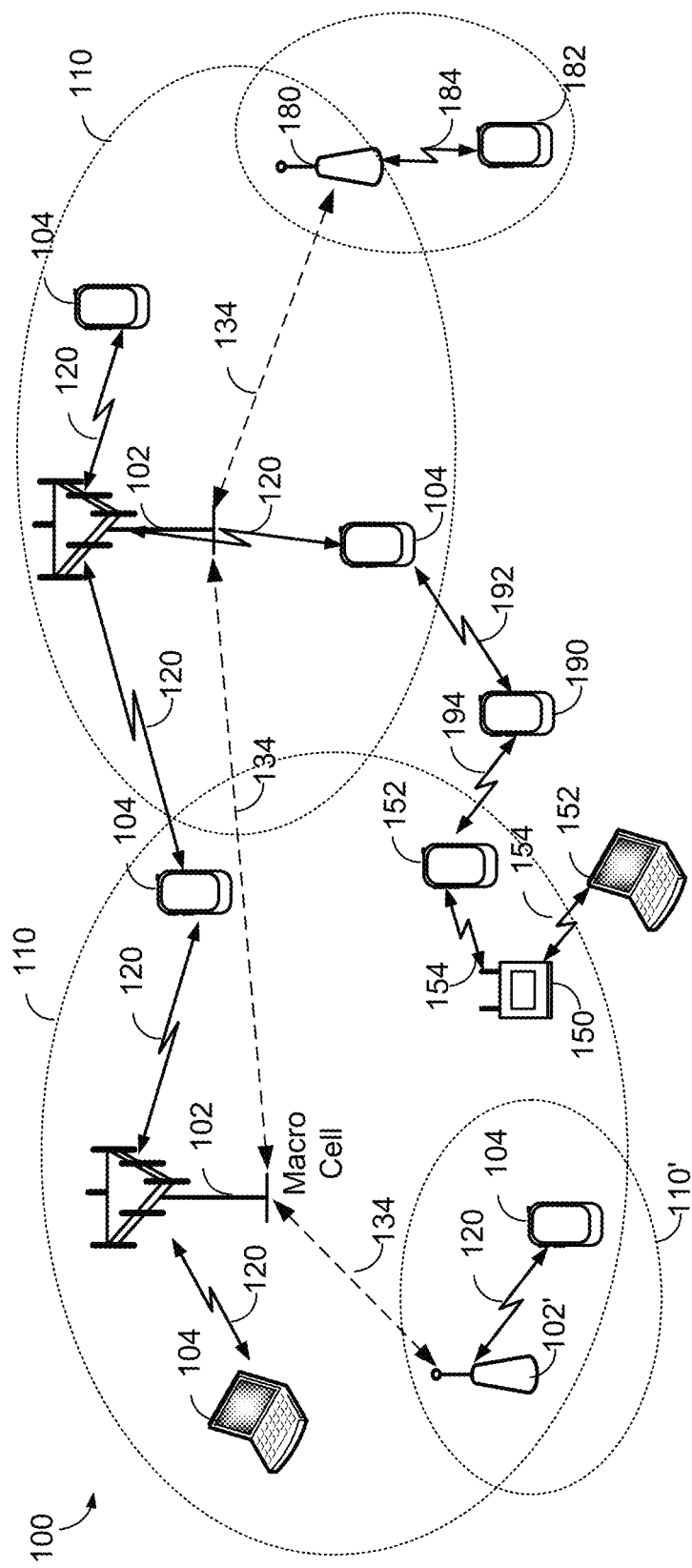
FIG. 1 illustrates an exemplary wireless communications system, according to various aspects.

Various aspects described herein generally relate to reference timing determination based on sidelink propagation delay.

These and other aspects are disclosed in the following description and related drawings to show specific examples relating to exemplary aspects. Alternate aspects will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects disclosed herein.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage, or mode of operation.

The terminology used herein describes particular aspects only and should not be construed to limit any aspects disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Further, various aspects may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequences of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to" and/or other structural components configured to perform the described action.

As used herein, the terms "user equipment" (or "UE"), "user device," "user terminal," "client device," "communication device," "wireless device," "wireless communications device," "handheld device," "mobile device," "mobile terminal," "mobile station," "handset," "access terminal," "subscriber device," "subscriber terminal," "subscriber station," "terminal," and variants thereof may interchangeably refer to any suitable mobile or stationary device that can receive wireless communication and/or navigation signals. These terms are also intended to include devices which communicate with another device that can receive wireless communication and/or navigation signals such as by short-range wireless, infrared, wireline connection, or other connection, regardless of whether satellite signal reception, assistance data reception, and/or position-related processing occurs at the device or at the other device. In addition, these terms are intended to include all devices, including wireless and wireline communication devices, that can communicate with a core network via a radio access network (RAN), and through the core network the UEs can be connected with external networks such as the Internet and with other UEs. Of course, other mechanisms of connecting to the core network and/or the Internet are also possible for the UEs, such as over a wired access network, a wireless local area network (WLAN) (e.g., based on IEEE 802.11, etc.) and so on. UEs can be embodied by any of a number of types of devices including but not limited to printed circuit (PC) cards, compact flash devices, external or internal modems, wireless or wireline phones, smartphones, tablets, tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

According to various aspects, FIG. 1 illustrates an exemplary wireless communications system 100. The wireless communications system 100 (which may also be referred to as a wireless wide area network (WWAN)) may include various base stations 102 and various UEs 104. The base stations 102 may include macro cells (high power cellular base stations) and/or small cells (low power cellular base stations), wherein the macro cells may include Evolved NodeBs (eNBs), where the wireless communications system 100 corresponds to an LTE network, or gNodeBs (gNBs), where the wireless communications system 100 corresponds to a 5G network or a combination of both, and the small cells may include femtocells, picocells, microcells, etc.

The base stations 102 may collectively form a Radio Access Network (RAN) and interface with an Evolved Packet Core (EPC) or Next Generation Core (NGC) through backhaul links. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, although not shown in FIG. 1, geographic coverage areas 110 may be subdivided into a plurality of cells (e.g., three), or sectors, each cell corresponding to a single antenna or array of antennas of a base station 102. As used herein, the term "cell" or "sector" may correspond to one of a plurality of cells of a base station 102, or to the base station 102 itself, depending on the context.

While neighboring macro cell geographic coverage areas 110 may partially overlap (e.g., in a handover region), some of the geographic coverage areas 110 may be substantially overlapped by a larger geographic coverage area 110. For example, a small cell base station 102' may have a geographic coverage area 110' that substantially overlaps with the geographic coverage area 110 of one or more macro cell base stations 102. A network that includes both small cell and macro cells may be known as a heterogeneous network. A heterogeneous network may also include Home eNBs (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) prior to communicating in order to determine whether the channel is available.

The small cell base station 102' may operate in a licensed and/or an unlicensed frequency spectrum. When operating in an unlicensed frequency spectrum, the small cell base station 102' may employ LTE or 5G technology and use the same 5 GHz unlicensed frequency spectrum as used by the WLAN AP 150. The small cell base station 102', employing LTE/5G in an unlicensed frequency spectrum, may boost coverage to and/or increase capacity of the access network. LTE in an unlicensed spectrum may be referred to as LTE-unlicensed (LTE-U), licensed assisted access (LAA), or MulteFire.

The wireless communications system 100 may further include a mmW base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 may utilize beamforming 184 with the UE 182 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

The wireless communications system 100 may further include one or more UEs, such as UE 190, that connects indirectly to one or more communication networks via one or more device-to-device (D2D) peer-to-peer (P2P) links. In the embodiment of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192-194 may be supported with any well-known D2D radio access technology (RAT), such as LTE Direct (LTE-D), WiFi Direct (WiFi-D), Bluetooth, and so on.

Figure 2A:
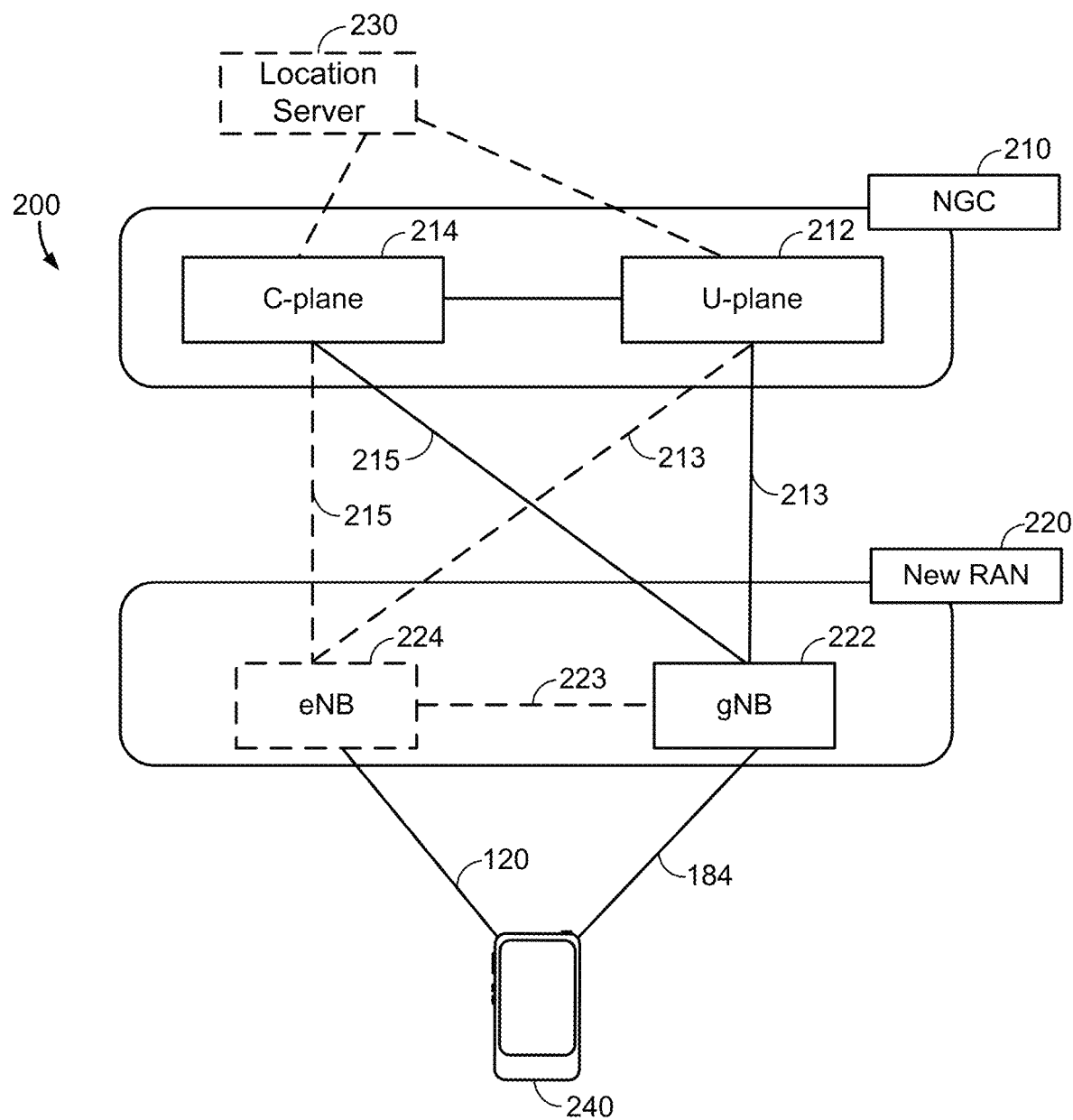
FIGS. 2A and 2B illustrate example wireless network structures, according to various aspects.

According to various aspects, FIG. 2A illustrates an example wireless network structure 200. For example, an NGC 210 can be viewed functionally as control plane functions 214 (e.g., UE registration, authentication, network access, gateway selection, etc.), and user plane functions 212 (e.g., UE gateway function, access to data networks, Internet protocol (IP) routing, etc.), which operate cooperatively to form the core network. User plane interface (NG-U) 213 and control plane interface (NG-C) 215 connect the gNB 222 to the NGC 210 and specifically to the control plane functions 214 and user plane functions 212. In an additional configuration, an eNB 224 may also be connected to the NGC 210 via NG-C 215 to the control plane functions 214 and NG-U 213 to user plane functions 212. Further, eNB 224 may directly communicate with gNB 222 via a backhaul connection 223. Accordingly, in some configurations, the New RAN 220 may only have one or more gNBs 222, while other configurations include one or more of both eNBs 224 and gNBs 222. Either gNB 222 or eNB 224 may communicate with UEs 240 (e.g., any of the UEs depicted in FIG. 1, such as UEs 104, UE 152, UE 182, UE 190, etc.). Another optional aspect may include a location server 230 that may be in communication with the NGC 210 to provide location assistance for UEs 240. The location server 230 can be implemented as a plurality of structurally separate servers, or alternately may each correspond to a single server. The location server 230 can be configured to support one or more location services for UEs 240 that can connect to the location server 230 via the core network, NGC 210, and/or via the Internet (not illustrated). Further, the location server 230 may be integrated into a component of the core network, or alternatively may be external to the core network.

Figure 2B:
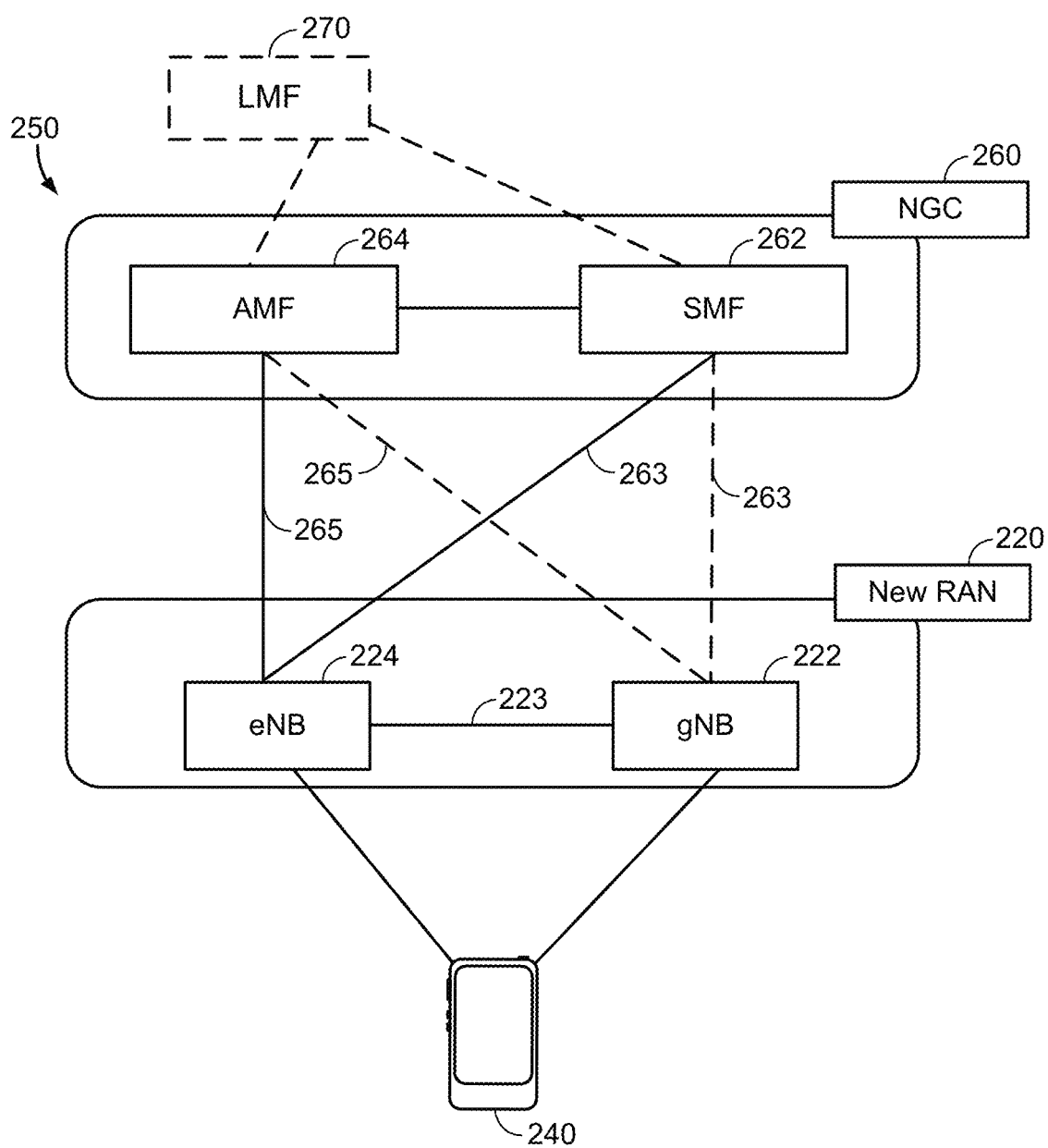

According to various aspects, FIG. 2B illustrates another example wireless network structure 250. For example, an NGC 260 can be viewed functionally as control plane functions, an access and mobility management function (AMF) 264 and user plane functions, and a session management function (SMF) 262, which operate cooperatively to form the core network. User plane interface 263 and control plane interface 265 connect the eNB 224 to the NGC 260 and specifically to AMF 264 and SMF 262. In an additional configuration, a gNB 222 may also be connected to the NGC 260 via control plane interface 265 to AMF 264 and user plane interface 263 to SMF 262. Further, eNB 224 may directly communicate with gNB 222 via the backhaul connection 223, with or without gNB direct connectivity to the NGC 260. Accordingly, in some configurations, the New RAN 220 may only have one or more gNBs 222, while other configurations include one or more of both eNBs 224 and gNBs 222. Either gNB 222 or eNB 224 may communicate with UEs 240 (e.g., any of the UEs depicted in FIG. 1, such as UEs 104, UE 182, UE 190, etc.). Another optional aspect may include a location management function (LMF) 270, which may be in communication with the NGC 260 to provide location assistance for UEs 240. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 240 that can connect to the LMF 270 via the core network, NGC 260, and/or via the Internet (not illustrated).

Figure 3A:
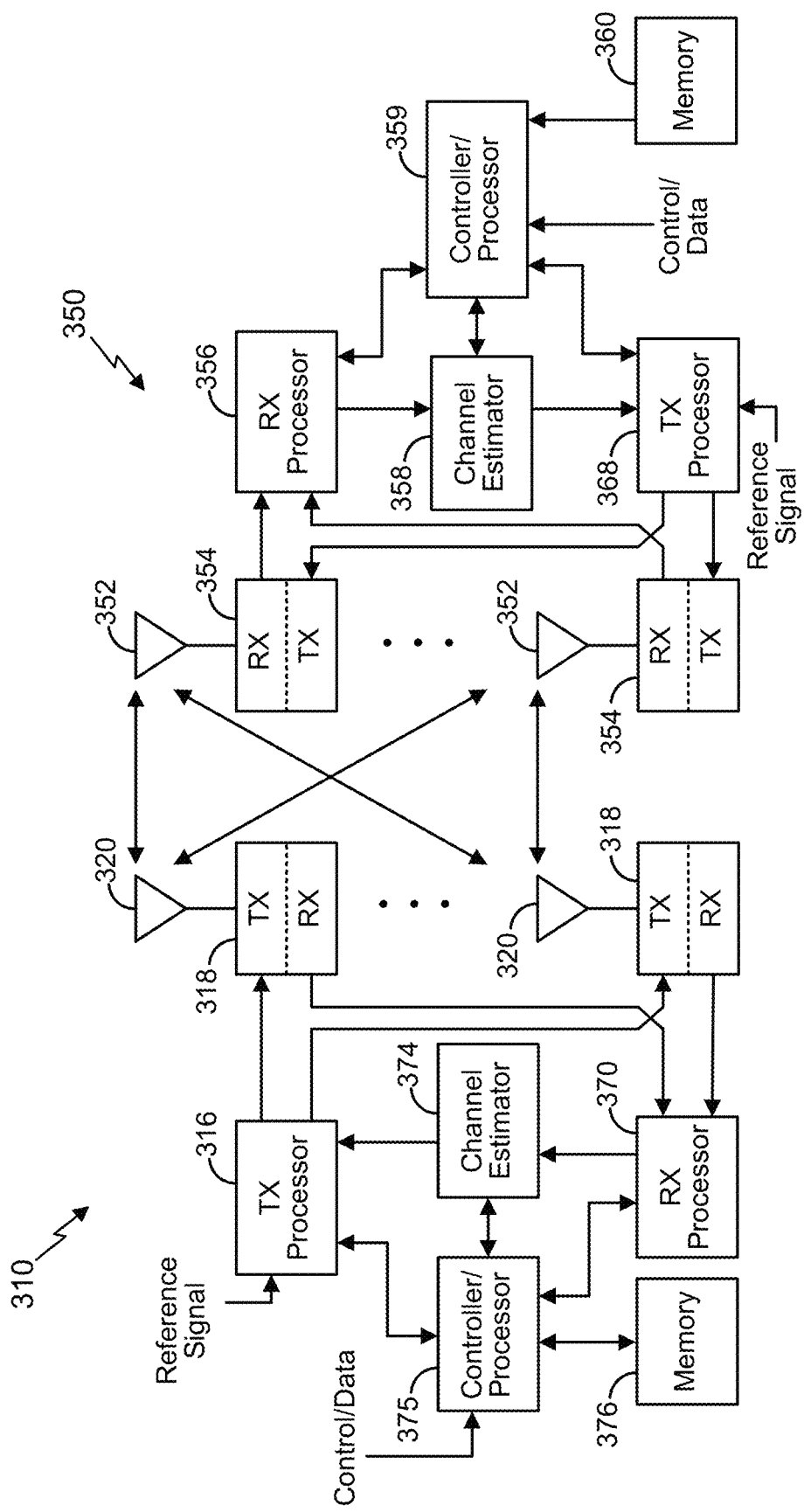
FIG. 3A illustrates an exemplary base station and an exemplary user equipment (UE) in an access network, according to various aspects.

According to various aspects, FIG. 3A illustrates an exemplary base station (BS) 310 (e.g., an eNB, a gNB, a small cell AP, a WLAN AP, etc.) in communication with an exemplary UE 350 (e.g., any of the UEs depicted in FIG. 1, such as UEs 104, UE 152, UE 182, UE 190, etc.) in a wireless network. In the DL, IP packets from the core network (NGC 210/EPC 260) may be provided to a controller/processor 375. The controller/processor 375 implements functionality for a radio resource control (RRC) layer, a packet data convergence protocol (PDCP) layer, a radio link control (RLC) layer, and a medium access control (MAC) layer. The controller/processor 375 provides RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmit (TX) processor 316 and the receive (RX) processor 370 implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency-division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to one or more different antennas 320 via a separate transmitter 318. Each transmitter 318 may modulate an RF carrier with a respective spatial stream for transmission.

At the UE 350, each receiver 354 receives a signal through its respective antenna 352. Each receiver 354 recovers information modulated onto an RF carrier and provides the information to the RX processor 356. The TX processor 368 and the RX processor 356 implement Layer-1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and de-interleaved to recover the data and control signals that were originally transmitted by the base station 310 on the physical channel. The data and control signals are then provided to the processing system 359, which implements Layer-3 and Layer-2 functionality.

The processing system 359 can be associated with a memory 360 that stores program codes and data. The memory 360 may be referred to as a non-transitory computer-readable medium. In the UL, the processing system 359 provides demultiplexing between transport and logical channels, packet reassembly, deciphering, header decompression, and control signal processing to recover IP packets from the core network. The processing system 359 is also responsible for error detection.

Similar to the functionality described in connection with the DL transmission by the base station 310, the processing system 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354. Each transmitter 354 may modulate an RF carrier with a respective spatial stream for transmission. In an aspect, the transmitters 354 and the receivers 354 may be one or more transceivers, one or more discrete transmitters, one or more discrete receivers, or any combination thereof.

The UL transmission is processed at the base station 310 in a manner similar to that described in connection with the receiver function at the UE 350. Each receiver 318 receives a signal through its respective antenna 320. Each receiver 318 recovers information modulated onto an RF carrier and provides the information to a RX processor 370. In an aspect, the transmitters 318 and the receivers 318 may be one or more transceivers, one or more discrete transmitters, one or more discrete receivers, or any combination thereof.

The processing system 375 can be associated with a memory 376 that stores program codes and data. The memory 376 may be referred to as a non-transitory computer-readable medium. In the UL, the processing system 375 provides demultiplexing between transport and logical channels, packet reassembly, deciphering, header decompression, control signal processing to recover IP packets from the UE 350. IP packets from the processing system 375 may be provided to the core network. The processing system 375 is also responsible for error detection.

Figure 3B:
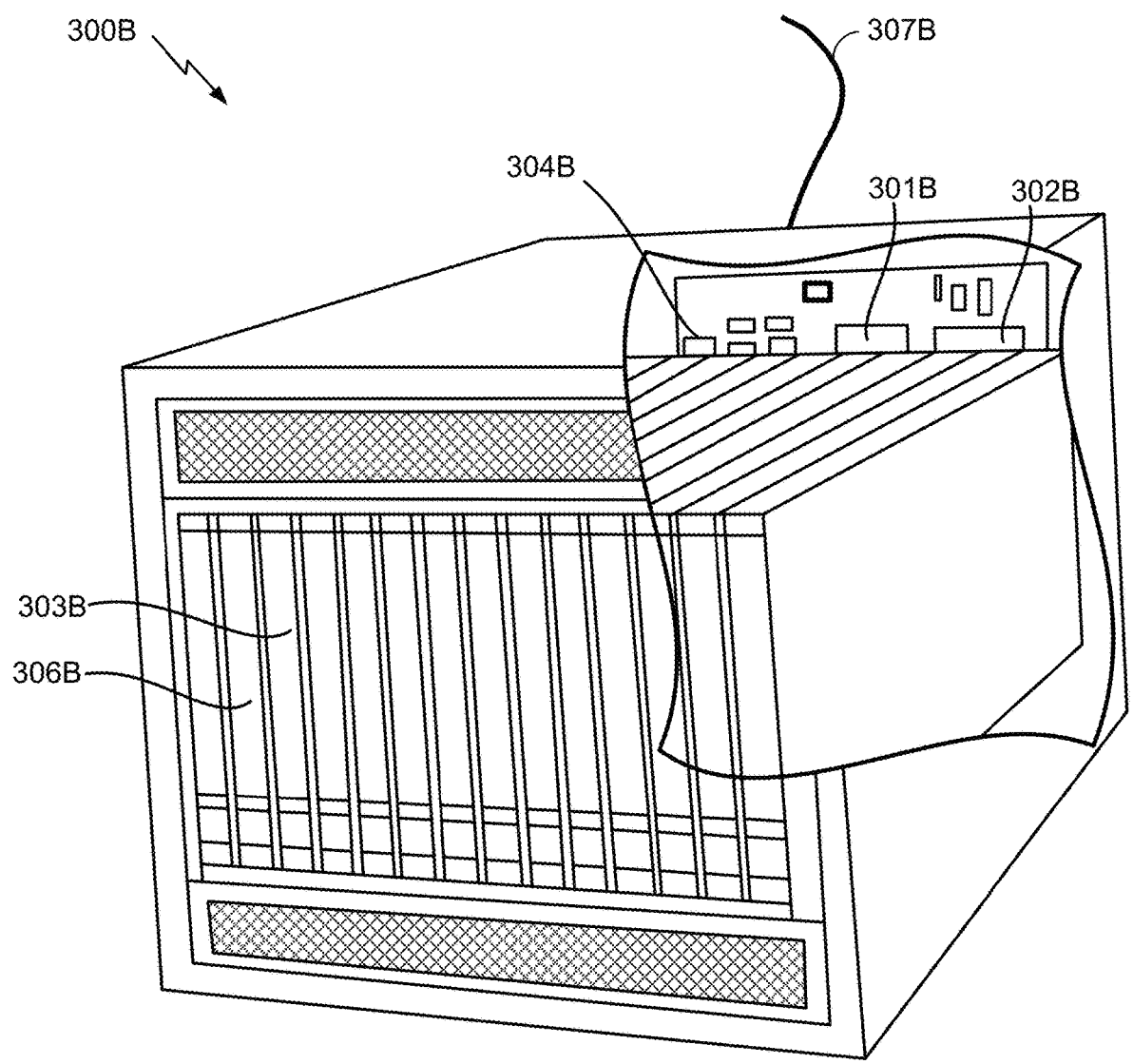
FIG. 3B illustrates an exemplary server according to various aspects.

FIG. 3B illustrates an exemplary server 300B. In an example, the server 300B may correspond to one example configuration of the location server 230 described above. In FIG. 3B, the server 300B includes a processor 301B coupled to volatile memory 302B and a large capacity nonvolatile memory, such as a disk drive 303B. The server 300B may also include a floppy disc drive, compact disc (CD) or DVD disc drive 306B coupled to the processor 301B. The server 300B may also include network access ports 304B coupled to the processor 301B for establishing data connections with a network 307B, such as a local area network coupled to other broadcast system computers and servers or to the Internet.

Figure 4:
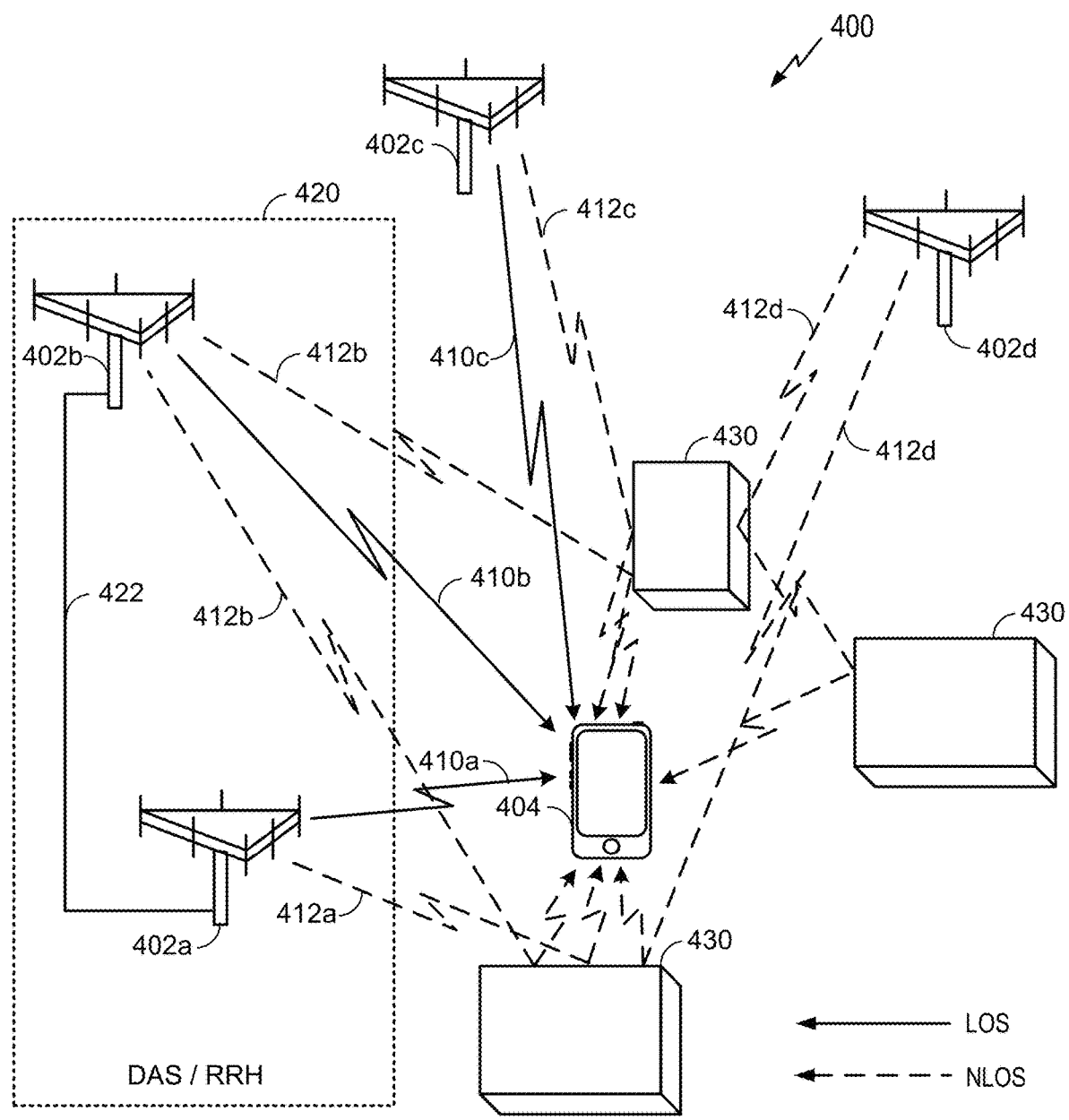
FIG. 4 illustrates an exemplary wireless communications system according to various aspects of the disclosure.

FIG. 4 illustrates an exemplary wireless communications system 400 according to various aspects of the disclosure. In the example of FIG. 4, a UE 404, which may correspond to any of the UEs described above with respect to FIG. 1 (e.g., UEs 104, UE 182, UE 190, etc.), is attempting to calculate an estimate of its position, or assist another entity (e.g., a base station or core network component, another UE, a location server, a third party application, etc.) to calculate an estimate of its position. The UE 404 may communicate wirelessly with a plurality of base stations 402a-d (collectively, base stations 402), which may correspond to any combination of base stations 102 or 180 and/or WLAN AP 150 in FIG. 1, using RF signals and standardized protocols for the modulation of the RF signals and the exchange of information packets. By extracting different types of information from the exchanged RF signals, and utilizing the layout of the wireless communications system 400 (i.e., the base stations locations, geometry, etc.), the UE 404 may determine its position, or assist in the determination of its position, in a predefined reference coordinate system. In an aspect, the UE 404 may specify its position using a two-dimensional coordinate system; however, the aspects disclosed herein are not so limited, and may also be applicable to determining positions using a three-dimensional coordinate system, if the extra dimension is desired. Additionally, while FIG. 4 illustrates one UE 404 and four base stations 402, as will be appreciated, there may be more UEs 404 and more or fewer base stations 402.

To support position estimates, the base stations 402 may be configured to broadcast reference RF signals (e.g., Positioning Reference Signals (PRS), Cell-specific Reference Signals (CRS), Channel State Information Reference Signals (CSI-RS), synchronization signals, etc.) to UEs 404 in their coverage areas to enable a UE 404 to measure reference RF signal timing differences (e.g., OTDOA or RSTD) between pairs of network nodes and/or to identify the beam that best excite the LOS or shortest radio path between the UE 404 and the transmitting base stations 402. Identifying the LOS/shortest path beam(s) is of interest not only because these beams can subsequently be used for OTDOA measurements between a pair of base stations 402, but also because identifying these beams can directly provide some positioning information based on the beam direction. Moreover, these beams can subsequently be used for other position estimation methods that require precise ToA, such as round-trip time estimation based methods.

As used herein, a "network node" may be a base station 402, a cell of a base station 402, a remote radio head, an antenna of a base station 402, where the locations of the antennas of a base station 402 are distinct from the location of the base station 402 itself, or any other network entity capable of transmitting reference signals. Further, as used herein, a "node" may refer to either a network node or a UE.

A location server (e.g., location server 230) may send assistance data to the UE 404 that includes an identification of one or more neighbor cells of base stations 402 and configuration information for reference RF signals transmitted by each neighbor cell. Alternatively, the assistance data can originate directly from the base stations 402 themselves (e.g., in periodically broadcasted overhead messages, etc.). Alternatively, the UE 404 can detect neighbor cells of base stations 402 itself without the use of assistance data. The UE 404 (e.g., based in part on the assistance data, if provided) can measure and (optionally) report the OTDOA from individual network nodes and/or RSTDs between reference RF signals received from pairs of network nodes. Using these measurements and the known locations of the measured network nodes (i.e., the base station(s) 402 or antenna(s) that transmitted the reference RF signals that the UE 404 measured), the UE 404 or the location server can determine the distance between the UE 404 and the measured network nodes and thereby calculate the location of the UE 404.

The term "position estimate" is used herein to refer to an estimate of a position for a UE 404, which may be geographic (e.g., may comprise a latitude, longitude, and possibly altitude) or civic (e.g., may comprise a street address, building designation, or precise point or area within or nearby to a building or street address, such as a particular entrance to a building, a particular room or suite in a building, or a landmark such as a town square). A position estimate may also be referred to as a "location," a "position," a "fix," a "position fix," a "location fix," a "location estimate," a "fix estimate," or by some other term. The means of obtaining a location estimate may be referred to generically as "positioning," "locating," or "position fixing." A particular solution for obtaining a position estimate may be referred to as a "position solution." A particular method for obtaining a position estimate as part of a position solution may be referred to as a "position method" or as a "positioning method."

The term "base station" may refer to a single physical transmission point or to multiple physical transmission points that may or may not be co-located. For example, where the term "base station" refers to a single physical transmission point, the physical transmission point may be an antenna of the base station (e.g., base station 402) corresponding to a cell of the base station. Where the term "base station" refers to multiple co-located physical transmission points, the physical transmission points may be an array of antennas (e.g., as in a MIMO system or where the base station employs beamforming) of the base station. Where the term "base station" refers to multiple non-co-located physical transmission points, the physical transmission points may be a Distributed Antenna System (DAS) (a network of spatially separated antennas connected to a common source via a transport medium) or a Remote Radio Head (RRH) (a remote base station connected to a serving base station). Alternatively, the non-co-located physical transmission points may be the serving base station receiving the measurement report from the UE (e.g., UE 404) and a neighbor base station whose reference RF signals the UE is measuring. Thus, FIG. 4 illustrates an aspect in which base stations 402*a* and 402*b* form a DAS/RRH 420. For example, the base station 402*a* may be the serving base station of the UE 404 and the base station 402*b* may be a neighbor base station of the UE 404. As such, the base station 402*b* may be the RRH of the base station 402*a*. The base stations 402*a* and 402*b* may communicate with each other over a wired or wireless link 422.

To accurately determine the position of the UE 404 using the OTDOAs and/or

RSTDs between RF signals received from pairs of network nodes, the UE 404 needs to measure the reference RF signals received over the LOS path (or the shortest NLOS path where an LOS path is not available), between the UE 404 and a network node (e.g., base station 402, antenna). However, RF signals travel not only by the LOS/shortest path between the transmitter and receiver, but also over a number of other paths as the RF signals spread out from the transmitter and reflect off other objects such as hills, buildings, water, and the like on their way to the receiver. Thus, FIG. 4 illustrates a number of LOS paths 410 and a number of NLOS paths 412 between the base stations 402 and the UE 404. Specifically, FIG. 4 illustrates base station 402*a* transmitting over an LOS path 410*a* and an NLOS path 412*a*, base station 402*b* transmitting over an LOS path 410*b* and two NLOS paths 412*b*, base station 402*c* transmitting over an LOS path 410*c* and an NLOS path 412*c*, and base station 402*d* transmitting over two NLOS paths 412*d*. As illustrated in FIG. 4, each NLOS path 412 reflects off some object 430 (e.g., a building). As will be appreciated, each LOS path 410 and NLOS path 412 transmitted by a base station 402 may be transmitted by different antennas of the base station 402 (e.g., as in a MIMO system), or may be transmitted by the same antenna of a base station 402 (thereby illustrating the propagation of an RF signal). Further, as used herein, the term "LOS path" refers to the shortest path between a transmitter and receiver, and may not be an actual LOS path, but rather, the shortest NLOS path.

In an aspect, one or more of base stations 402 may be configured to use beamforming to transmit RF signals. In that case, some of the available beams may focus the transmitted RF signal along the LOS paths 410 (e.g., the beams produce highest antenna gain along the LOS paths) while other available beams may focus the transmitted RF signal along the NLOS paths 412. A beam that has high gain along a certain path and thus focuses the RF signal along that path may still have some RF signal propagating along other paths; the strength of that RF signal naturally depends on the beam gain along those other paths. An "RF signal" comprises an electromagnetic wave that transports information through the space between the transmitter and the receiver. As used herein, a transmitter may transmit a single "RF signal" or multiple "RF signals" to a receiver. However, as described further below, the receiver may receive multiple "RF signals" corresponding to each transmitted RF signal due to the propagation characteristics of RF signals through multipath channels.

Where a base station 402 uses beamforming to transmit RF signals, the beams of interest for data communication between the base station 402 and the UE 404 will be the beams carrying RF signals that arrive at UE 404 with the highest signal strength (as indicated by, e.g., the Received Signal Received Power (RSRP) or SINR in the presence of a directional interfering signal), whereas the beams of interest for position estimation will be the beams carrying RF signals that excite the shortest path or LOS path (e.g., an LOS path 410). In some frequency bands and for antenna systems typically used, these will be the same beams. However, in other frequency bands, such as mmW, where typically a large number of antenna elements can be used to create narrow transmit beams, they may not be the same beams.

Sidelink communications relate to peer-to-peer communications between UEs in accordance with a device-to-device (D2D) protocol (e.g., V2V, V2X, LTE-D, WiFi-Direct, etc.). In some designs, synchronization (e.g., time and frequency synchronization) is achieved whereby one or more UEs act as a synchronization source (referred to as SyncRef UE). Generally, the peer UEs that belong to a particular sidelink communications network attempt to maintain a common reference time to facilitate sidelink communications among the peer UEs.

In some designs, sidelink communication links are decoupled from sidelink synchronization links. For example, two peer UEs participating in sidelink communication with each other are not required to designate one or the other as a synchronization source for deriving their respective time and frequency resources. In some designs, certain system-wide resources are designated or reserved for sidelink synchronization signaling in an SFN-based manner (e.g., in 3GPP Rel. 12, 2 resources are reserved for sidelink synchronization signaling at each synchronization period). In such an implementation, there is no beam management functionality that carries over from sidelink synchronization to sidelink communication (e.g., because the sidelink synchronization signaling is transported via an SFN-based manner).

In some designs, SyncRef UEs can be connected directly to a base station (e.g., gNB) or Global Navigation Satellite System (GNSS), as shown below with respect to FIG. 5. In other designs, SyncRef UEs can be indirectly connected to the base station or GNSS (e.g., more than one hop away via one or more peer UEs in the sidelink communications network). In yet other designs, SyncRef UEs can act as independent synchronization sources without any direct or indirect connection to a base station or GNSS.

Figure 5:
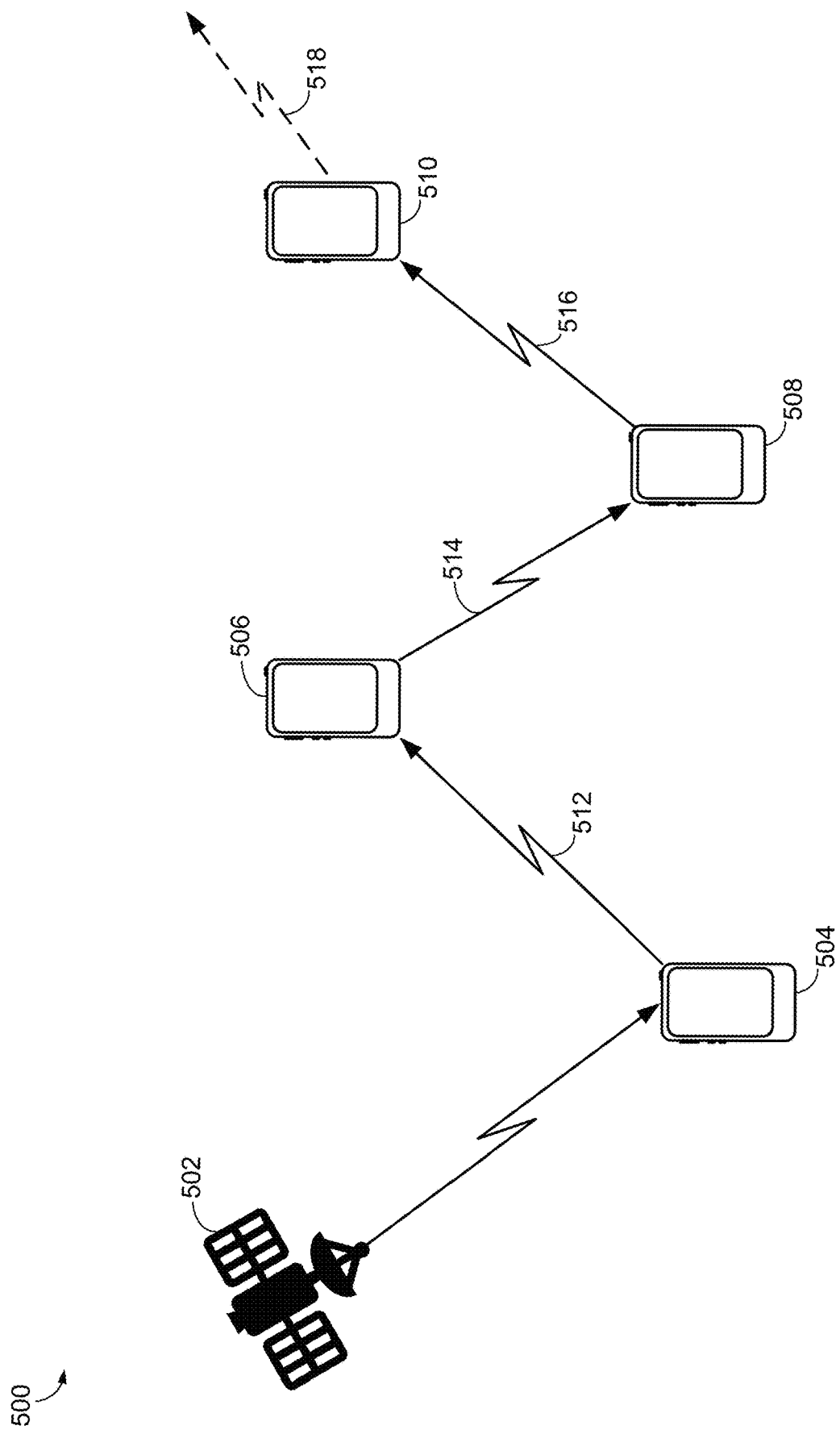
FIG. 5 illustrates a sidelink communications network in accordance with an embodiment of the disclosure.

FIG. 5 illustrates a sidelink communications network 500 in accordance with an embodiment of the disclosure. Referring to FIG. 5, the sidelink communications network 500 comprises a GNSS satellite 502 and UEs 504, 506, 508 and 510. UE 504 is synchronized with a network clock of the GNSS satellite 502 based on receipt of various GNSS signals. UE 504 is connected to UE 506 via a sidelink communications link 512, UE 506 is connected to UE 508 via a sidelink communications link 514, and UE 508 is connected to UE 510 via a sidelink communications link 516. While not shown, one or more of UEs 504-510 may also be connected to a terrestrial communications network. In FIG. 5, UE 504 corresponds to the SyncRef UE. Also, while not shown, UE 510 may be further connected to yet another peer UE over a sidelink communications link 518, and so on.

As noted above, certain networks reserve 2 resources for sidelink synchronization signaling. In an example of such a system, the sidelink synchronization signaling over the sidelink communications links 512-516 may be configured as shown in Table 1 (in Table 1, INC corresponds to in-coverage indicator, which indicates if the UE is directly synchronized either to GNSS or eNB), as follows:

TABLE 1

| Link | Synchronization Signal Configuration |
|---|---|
| 512 | Sidelink Synchronization Signal ID (SLSS ID) = 0<br>Subframe = Resource 1<br>INC = True |
| 514 | SLSS ID = SLSS ID of SyncRef UE (UE 504) + 168 = 0 + 168<br>Subframe = Resource 2<br>INC = False |
| 516 | SLSS ID = SLSS ID of SyncRef UE (UE 504) = 0<br>Subframe = Resource 1<br>INC = False |
| 518 | SLSS ID = SLSS ID of SyncRef UE (UE 504) = 0<br>Subframe = Resource 2<br>INC = False |

As shown in Table 1, the Subframe used for the SLSS transmission alternates at each hop in the sidelink communications network 500 between Resources 1 and 2 because there are only two available resources for the SLSS transmissions.

Figure 6:
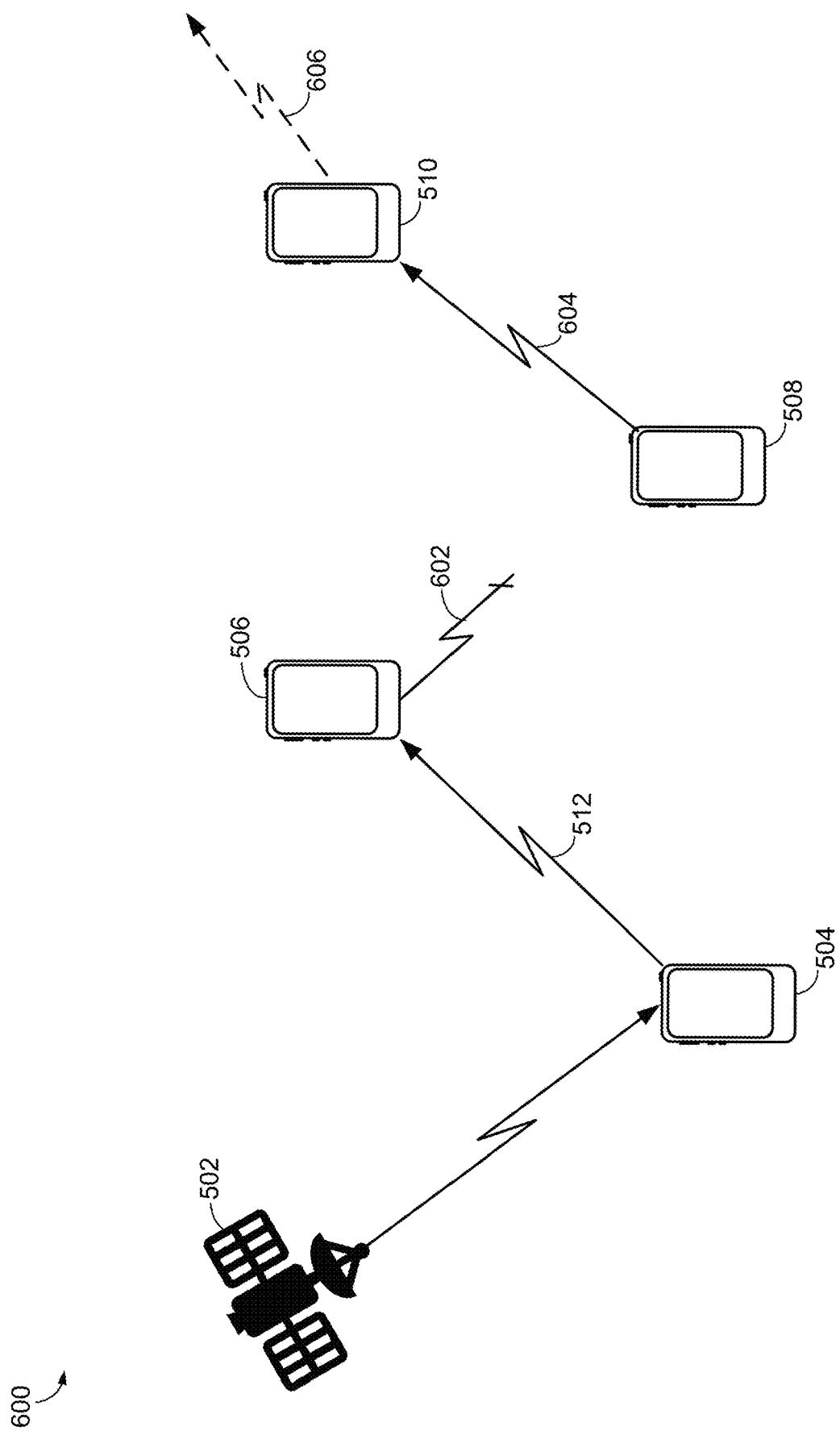
FIG. 6 illustrates a sidelink communications network in accordance with another embodiment of the disclosure.

FIG. 6 illustrates a sidelink communications network 600 in accordance with another embodiment of the disclosure. In FIG. 6, UE 506 and UE 508 lose their connection to each other as shown at 602. Hence, UEs 508 and 510 are disconnected from the GNSS-synchronized UE 504 which was acting as the SyncRef UE in the sidelink communications network 500 of FIG. 5. UEs 508-510 thereby form a new GNSS-independent sidelink communications network. In an example, assume that UE 508 becomes the SyncRef UE for the new GNSS-independent sidelink communications network. Also, while not shown, UE 510 may be further connected to yet another peer UE over a sidelink communications link 606, and so on.

In this case, in a system whereby 2 resources are reserved for sidelink synchronization signaling, the sidelink synchronization signaling over sidelink communications links 604-606 may be configured as shown in Table 2, as follows:

TABLE 2

| Link | Synchronization Signal Configuration |
| --- | --- |
| 604 | Sidelink Synchronization Signal ID (SLSS ID) = Random (e.g., between 170-355)<br>Subframe = Resource 1 or 2<br>INC = FALSE |
| 606 | SLSS ID = SLSS ID of SyncRef UE (UE 508) + 168 = 0 + 168<br>Subframe = Resource 1 or 2 (opposite of that used by UE 508)<br>INC = False |

For a UE that derives its synchronization from a SyncRef UE, a reference timing is the 'received timing' of the SyncRef UE's synchronization signals (e.g., SFNed) at the receiver (e.g., unsynchronized UE), in a manner that is analogous to downlink timing synchronization with respect to a base station. Sidelink physical channels and signals (for communication) may be transmitted based on this reference timing. In some designs, sidelink communications networks do not support a timing advance (TA) as in the case of UE-to-gNB uplink. In such sidelink communications networks, the propagation delay along each hop in the sidelink communications network contributes to a timing error between the SyncRef UE and each successive UE at each hop of the sidelink communications network. This timing error depends on the propagation distance along each hop as well as the number of hops from the original synchronization source (e.g., hops from GNSS satellite 502 or terrestrial base station, or the SyncRef UE itself in the case of an unsynchronized network).

Figure 7:
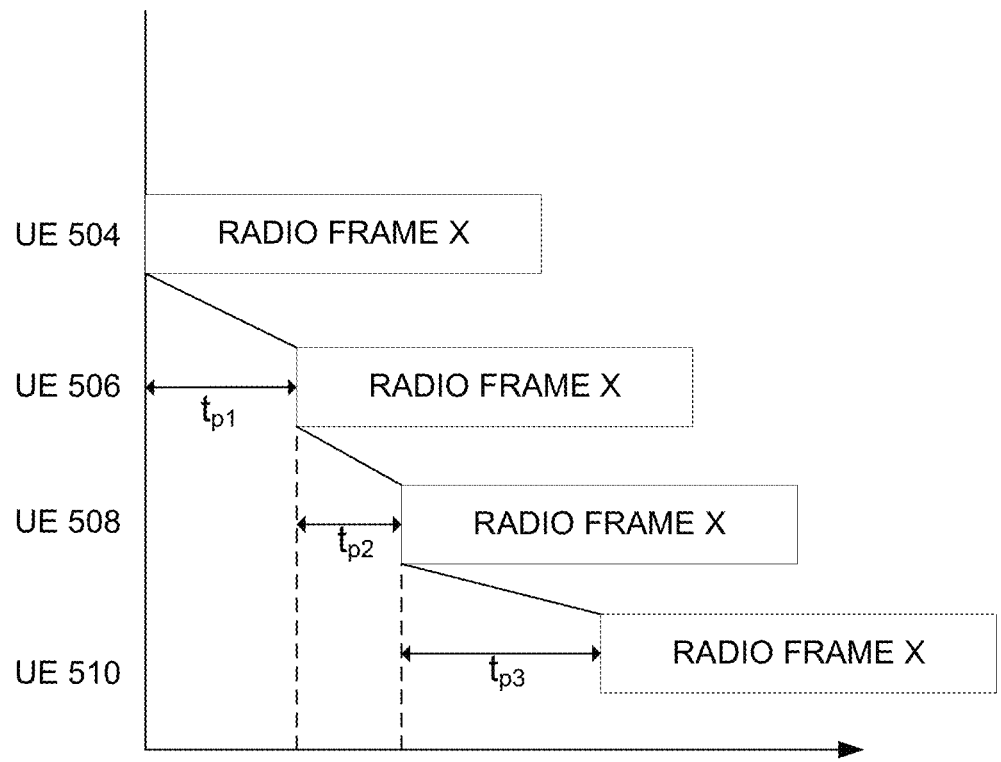
FIG. 7 illustrates successively higher timing errors along hops of the sidelink communications network in accordance with an embodiment of the disclosure.

FIG. 7 illustrates successively higher timing errors along hops of the sidelink communications network 500 in accordance with an embodiment of the disclosure. In particular, timing errors are shown in FIG. 7 relative to a particular radio frame denoted as radio frame X. Referring to FIG. 7, UE 504's timing is set to the GNSS timing, UE 506's timing is set to UE 504's timing plus a propagation delay to, UE 508's timing is set to UE 506's timing plus a propagation delay $t_{p2}$, UE 510's timing is set to UE 508's timing plus a propagation delay $t_{p3}$, and so on. Accordingly, the further away a peer UE from the SyncRef UE in terms of hops, the greater the timing error. Moreover, while FIG. 7 is described with respect to the GNSS-synchronized sidelink communications network 500 of FIG. 5, the same problem occurs in sidelink communications networks which lack synchronization with a network clock.

Figure 8:
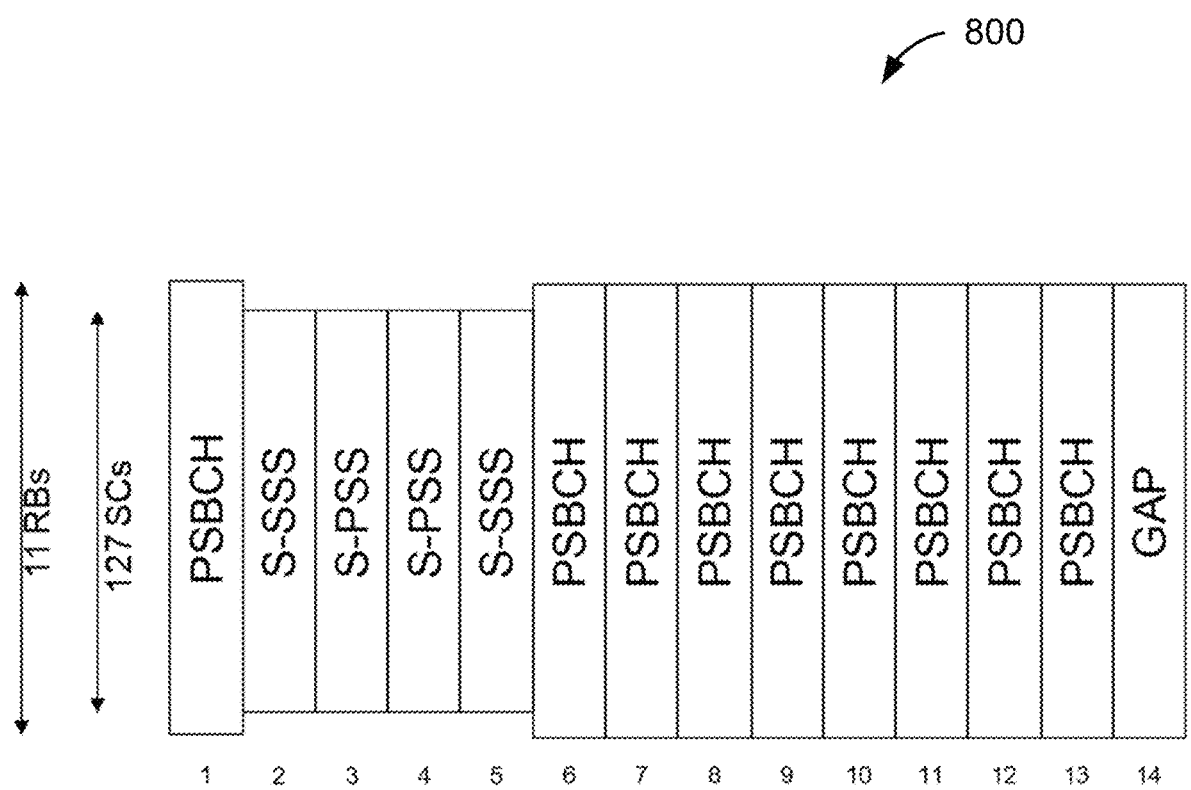
FIG. 8 illustrates an example frame structure that supports sidelink synchronization signals in accordance with an embodiment of the disclosure.

FIG. 8 illustrates an example frame structure 800 that supports sidelink synchronization signals in accordance with an embodiment of the disclosure. As shown in FIG. 8, the frame structure 800 includes 14 subframes, with subframes 2 and 5 allocated to sidelink secondary synchronization signals (S-SSS), subframes 3-4 allocated to sidelink primary synchronization signals (S-PSS), subframes 6-13 allocated to PSBCH and subframe 14 functioning as a gap. In some designs, the sidelink sync signal block (S-SSB, which comprises S-PSS and S-SSS) periodicity may be 160 ms, although this period may be configurable. The periodicity in this context refers to how often the frame structure 800 is repeated (e.g., every 160 ms). In some designs, the frame structure 800 may be used to support vehicle-based communications, such as NR vehicle-to-everything (V2X) communications. Among other things, the frame structure 800 may be used for sidelink communication-related functionality, including resource selection, S-SSB ID determination, SyncRef UE selection and/or re-selection, and so on.

Embodiments of the disclosure are directed to mechanisms by which a reference timing can be determined in a sidelink communications network that takes the propagation delay over one or more hops into account. In some designs, the reference timing can be calculated in this manner while a SyncRef UE is synchronized with respect to a network clock (e.g., GNSS clock or terrestrial network clock), while in other designs, the reference timing can be calculated in this manner while a SyncRef UE IS unsynchronized with respect to the network clock.

Figure 9:
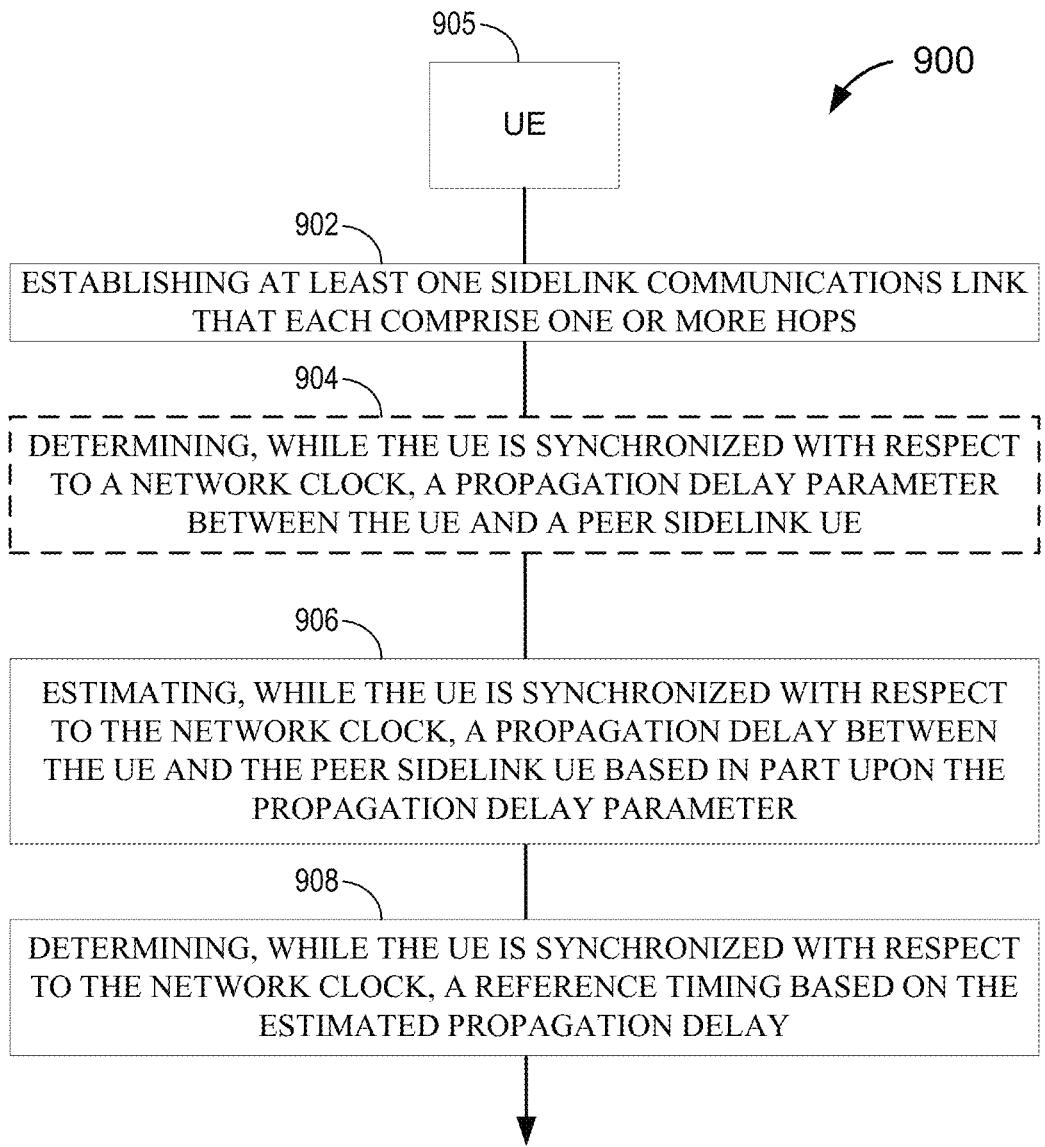
FIG. 9 illustrates an exemplary process of determining a reference timing according to an aspect of the disclosure.

FIG. 9 illustrates an exemplary process 900 of determining a reference timing according to an aspect of the disclosure. The process 900 of FIG. 9 is performed by a UE, which may correspond to any of the above-noted UEs (e.g., UE 240, 350, 504, 506, 508, 510, etc.). At 902, the UE (e.g., controller/processor 359, antenna(s) 352, receiver(s) 354, RX processor 356, transmitter(s) 354, and/or TX processor 368) establishes, with a peer sidelink UE, at least one sidelink communications link that each comprises one or more hops.

At 904, the UE (e.g., controller/processor 359, antenna(s) 352, receiver(s) 354, RX processor 356, transmitter(s) 354, and/or TX processor 368) optionally determines while the UE is synchronized with respect to a network clock (e.g., a GNSS clock, a terrestrial network clock, etc.), a propagation delay parameter between the UE and a peer sidelink UE. In some designs, the determination performed by the UE at 904 is optional because the propagation delay parameter can instead be obtained at least in part via crowdsourcing from one or more other UEs. For example, the propagation delay parameter can be determined by another UE that is (or was previously) located in proximity to the UE's current location, and then forwarded to the UE (e.g., either directly or indirectly). In another example, the propagation delay parameter may be averaged from propagation delay parameters determined by a plurality of such UEs (e.g., a weighted average, whereby more recently determined propagation delay parameters or propagation delay parameters determined in closer proximity to the UE's current location are prioritized more highly than other propagation delay parameters, etc.). In a further example, the propagation delay parameter may be determined by the UE at 904 and then may itself be averaged or weighted based on one or more crowdsourced propagation delay parameter(s). In some designs, irrespective of whether the UE or some other UE or combination of UEs determines the propagation delay parameter, each UE whose measurements contribute to the propagation delay parameter in some manner is synchronized with respect to the network clock when such measurements are made. In one embodiment, the crowdsource information may be collated and averaged at a server, a network edge and/or road-side unit (RSU), and thereafter provided to the UE.

With respect to 904, the network clock synchronization can either be direct or indirect. For example, in context with FIG. 5, UE 504 is directly synchronized with the GNSS clock of GNSS satellite 502, whereas UEs 506-510 are indirectly synchronized with the GNSS clock of GNSS satellite 502 via their respective sidelink hops to UE 504. In context with FIG. 6, UE 504 is directly synchronized with the GNSS clock of GNSS satellite 502, UE 506 is indirectly synchronized with the GNSS clock of GNSS satellite 502 via its respective sidelink hop to UE 504, and UEs 508-508 are unsynchronized with the GNSS clock of GNSS satellite 502.

At 906, the UE (e.g., controller/processor 359) estimates, while the UE is synchronized with respect to the network clock, a propagation delay between the UE and the peer sidelink UE based in part upon the propagation delay parameter. As will be described below in more detail, the propagation delay parameter can correspond to a calculated propagation delay between the UE and the peer sidelink UE. In this case, the estimating of 906 simply reuses the propagation delay that was determined at 904. Alternatively, the propagation delay parameter can correspond to a relationship between various metrics by which the propagation delay (or propagation time) can be estimated. In this case, the estimating of 906 may involve determining these metrics and then estimating the propagation delay (or propagation time) as a function of the determined relationship. The relationship may be determined locally at the UE, or may be crowdsourced from one or more other UEs, or a combination thereof. These aspects will be explained in more detail below.

At 908, the UE (e.g., controller/processor 359) determines, while the UE is synchronized with respect to the network clock, a reference timing based on the estimated propagation delay. In an example, the reference timing determination 908 may be performed with respect to Radio Frame X as in FIG. 7, except a respective UE at each hop compensates for the propagation delay on that hop ($t_{p1}$, $t_{p2}$, or $t_{p3}$) such that the Radio Frame X does not drift as the hop count increases as shown in FIG. 7.

Figure 10:
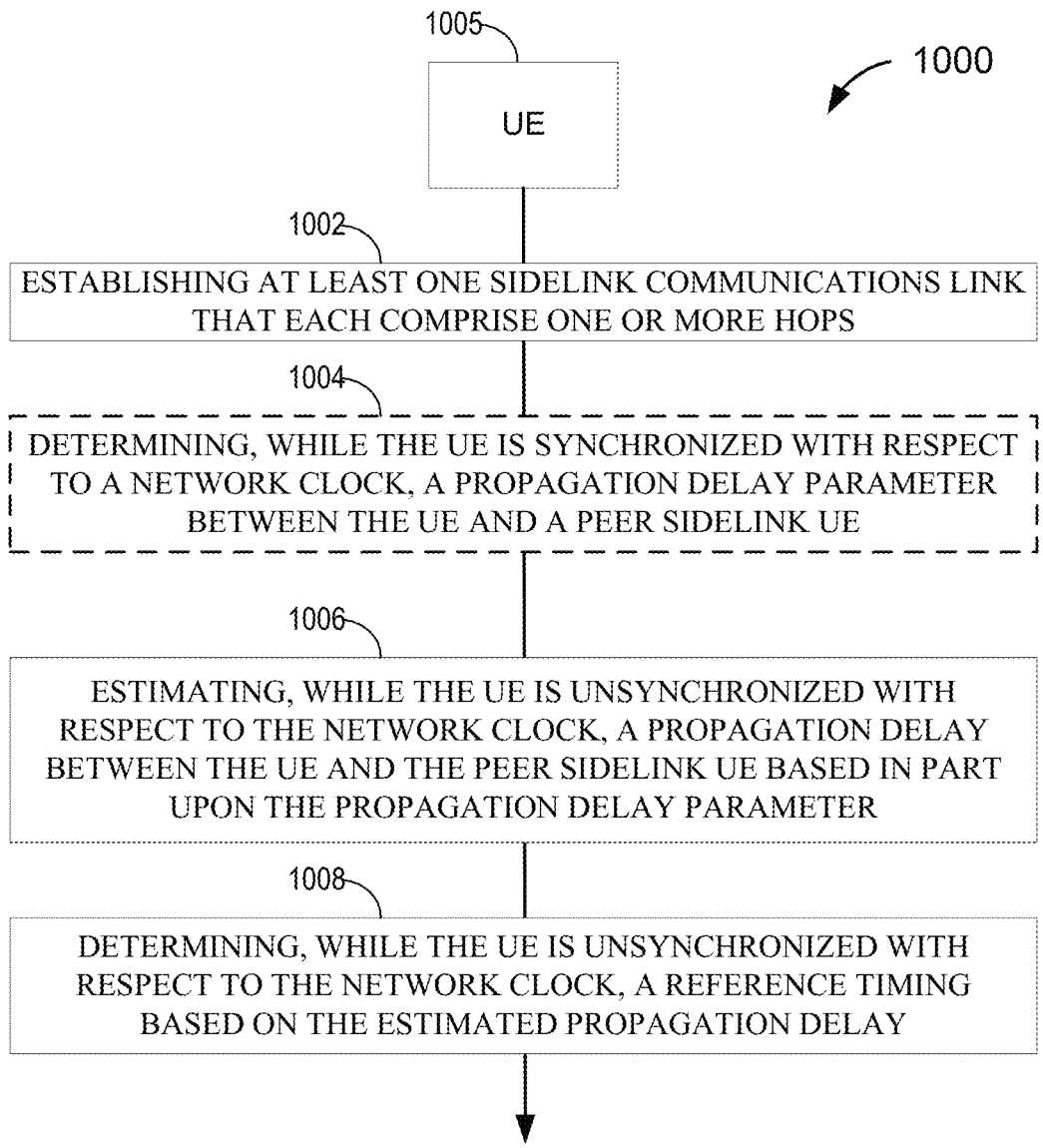
FIG. 10 illustrates an exemplary process of determining a reference timing according to another aspect of the disclosure.

FIG. 10 illustrates an exemplary process 1000 of determining a reference timing according to another aspect of the disclosure. The process 1000 of FIG. 10 is performed by a UE, which may correspond to any of the above-noted UEs (e.g., UE 240, 350, 504, 506, 508, 510, etc.). At 1002, the UE (e.g., controller/processor 359, antenna(s) 352, receiver(s) 354, RX processor 356, transmitter(s) 354, and/or TX processor 368) establishes, with a peer sidelink UE, at least one sidelink communications link that each comprises one or more hops.

At 1004, the UE (e.g., controller/processor 359, antenna(s) 352, receiver(s) 354, RX processor 356, transmitter(s) 354, and/or TX processor 368) determines while the UE is synchronized with respect to a network clock (e.g., a GNSS clock, a terrestrial network clock, etc.), a propagation delay parameter between the UE and a peer sidelink UE. In an example, 1002-1004 may correspond to 902-904 of FIG. 9. In some designs, the determination performed by the UE at 1004 is optional because the propagation delay parameter can instead be obtained at least in part via crowdsourcing from one or more other UEs. For example, the propagation delay parameter can be determined by another UE that is (or was previously) located in proximity to the UE's current location, and then forwarded to the UE (e.g., either directly or indirectly). In another example, the propagation delay parameter may be averaged from propagation delay parameters determined by a plurality of such UEs (e.g., a weighted average, whereby more recently determined propagation delay parameters or propagation delay parameters determined in closer proximity to the UE's current location are prioritized more highly than other propagation delay parameters, etc.). In a further example, the propagation delay parameter may be determined by the UE at 1004 and then may itself be averaged or weighted based on one or more crowdsourced propagation delay parameter(s). In some designs, irrespective of whether the UE or some other UE or combination of UEs determines the propagation delay parameter, each UE whose measurements contribute to the propagation delay parameter in some manner is synchronized with respect to the network clock when such measurements are made. In one embodiment, the crowdsource information may be collated and averaged at a server, a network edge and/or RSU and thereafter provided to the UE.

At some point after 1004, assume that the UE becomes unsynchronized with respect to the network clock (e.g., as shown in FIG. 6 with respect to UEs 508 and 510). With respect to 1006, the UE (e.g., controller/processor 359) estimates, while the UE is unsynchronized with respect to the network clock, a propagation delay (or propagation time) between the UE and the peer sidelink UE based in part upon the propagation delay parameter that was determined while the UE was synchronized with respect to the network clock. Hence, even though the propagation delay parameter may be somewhat out-of-date, the propagation delay parameter is leveraged for some period of time. As will be appreciated described in more detail below, if the propagation delay parameter comprises a relationship between metrics, up-to-date values of those metrics can be ascertained and then applied to the predetermined relationship to derive an estimate of the propagation delay. Alternatively, if the propagation delay parameter corresponds to an earlier calculated propagation delay, that earlier calculated propagation delay (from when the UE 1005 was synchronized) can simply be used as the estimated propagation delay. The relationship may be determined locally at the UE, or may be crowdsourced from one or more other UEs, or a combination thereof.

At 1008, the UE (e.g., controller/processor 359) determines, while the UE is unsynchronized with respect to the network clock, a reference timing based on the estimated propagation delay. In an example, the reference timing determination 1008 may be performed with respect to Radio Frame X as in FIG. 7, except a respective UE at each hop compensates for the propagation delay on that hop ($t_{p1}$, $t_{p2}$, or $t_{p3}$) such that the Radio Frame X does not drift as the hop count increases as shown in FIG. 7.

Figure 11:
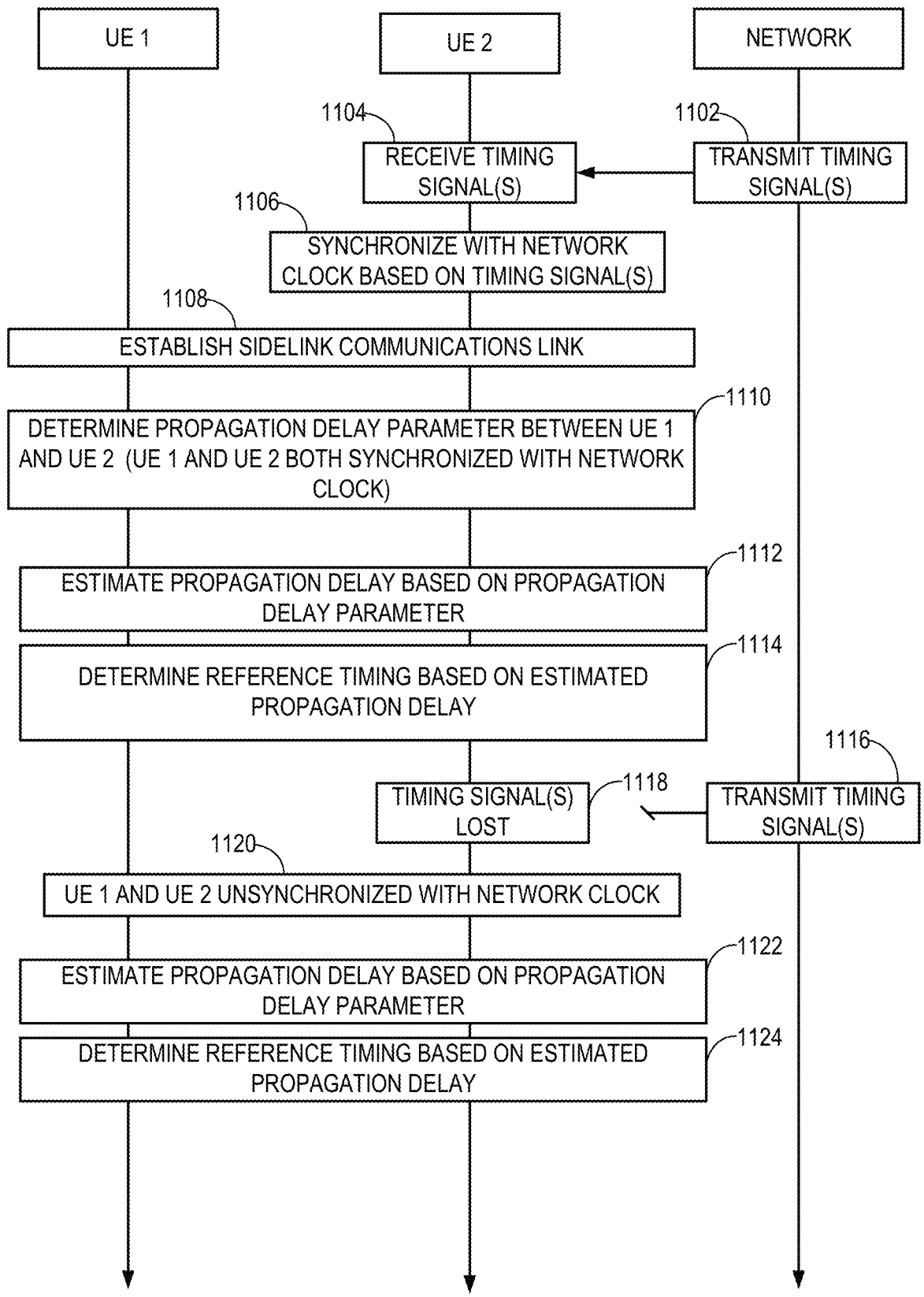
FIG. 11 illustrates an example implementation of the processes in accordance with an embodiment of the disclosure.

FIG. 11 illustrates an example implementation of the processes 900-1000 in accordance with an embodiment of the disclosure. The exemplary process of FIG. 11 is described with respect to the embodiment whereby UE 1 and/or UE 2 determine their own respective propagation delay parameter(s) (e.g., propagation time to RSRP relationship). However, in other embodiments, the determination of the propagation delay parameter(s) may be at least partially crowdsourced.

At 1102, a network (e.g., GNSS satellite 502, base station 310, etc.) transmits timing signal(s) that are based on a network clock, and UE 2 receives the timing signals at 1104. At 1106, UE 2 synchronizes with the network clock based on the received timing signal(s). At 1108, UEs 1 and 2 establish a sidelink communications link (e.g., as in 902 of FIG. 9 or 1002 of FIG. 10). At 1110, UE 1 and/or UE 2 determine a propagation delay parameter between UEs 1 and 2 (e.g., as in 904 of FIGS. 9 and 1004 of FIG. 10). At this point, UE 2 (and possibly UE 1 as well) is synchronized with respect to the network clock. At 1112, UE 1 and/or UE 2 estimate a propagation delay based on the propagation delay parameter (e.g., as in 906 of FIG. 9). At 1114, UE 1 and/or UE 2 determine a reference timing based on the estimated propagation delay from 1112 (e.g., as in 908 of FIG. 9).

Referring to FIG. 11, at 1116, the network transmits timing signal(s) that are based on the network clock, but the timing signal(s) are lost at 1118 (i.e., not successfully received by UE 2). At 1120, both UEs 1 and 2 are unsynchronized with the network clock due to the loss of the timing signal(s). At 1122, UE 1 and/or UE 2 estimate the propagation delay based on the propagation delay parameter determined at 1110 (e.g., as in 1006 of FIG. 10). At 1124, UE 1 and/or UE 2 determine a reference timing based on the estimated propagation delay from 1122 (e.g., as in 908 of FIG. 9).

In some designs, the propagation delay parameter described above with respect to FIGS. 8-11 may comprise a relationship between a propagation time and Reference Signal Received Power (RSRP). The RSRP is typically environmentally dependent so the above-noted relationship cannot be applied globally between peer UEs. However, a propagation-to-RSRP relationship may generally be reliable for some threshold period of time depending on the stability of the environment and UE mobility. In an example, the relationship can be computed while a SyncRef UE is synchronized with the network clock with a known location. At this time, RSRP is measured and parameters that characterize the propagation-to-RSRP relationship are calculated. One example propagation-to-RSRP relationship (or function f( )) is as follows:

$$RSRP = const*(distance)^{alpha};$$

$$f(RSRP) = (RSRP/a)^b,$$

whereby the parameters 'a' and 'b' can later be reused to estimate the propagation delay while the respective UEs are unsynchronized, const is a constant value based on the well known free-space path loss (FSPL) formula which derives from the Friis transmission formula, and alpha is a path-loss value (e.g., in free space alpha =2, in an environment with reflections such as multi-path alpha may range between 2.5 to 4, etc.).

In an example, sidelink synchronization signals can be used to derive the propagation-to-RSRP relationship. However, this is not strictly necessary, and other sidelink signals can also be used. For example, a DMRS over a sidelink communication channel can be used to derive the propagation-to-RSRP relationship (e.g., so long as the sidelink communication includes the synchronization status of the transmitting UE). Hence, any reference signal (e.g., DMRS, CSI-RS, etc.) or synchronization signals (SSB) from a transmitting UE that it itself synchronized (so that its Tx timing is accurate up to allowed limits) can be used to facilitate the determination of the propagation-to-RSRP relationship. Later, when the respective UEs lose their network clock synchronization, the RSRP (e.g., of sidelink synchronization signals) can be measured while unsynchronized with the predetermined propagation-to-RSRP relationship being used to estimate the propagation time (while unsynchronized).

More specifically, in some designs, when unsynchronized, the reference timing can be derived using a sidelink synchronization signal transmitted by a peer UE based on a function of the received timing of the synchronization signal from the peer UE, the RSRP of the sidelink synchronization signal, and an estimate of the propagation time using the predetermined propagation-to-RSRP relationship (f( )).

In one example, the timing reference determination at 908 or 1008 comprises:
Estimating a first reference time (t1) as the time of reception of a synchronization signal transmitted by a SyncRef UE,
Estimating the RSRP of the synchronization signal,
Estimating a second reference time (t2) as the $t2=t1-f^{-1}$ (RSRP), Using the second reference time (t2) as the timing reference for transmission of sidelink physical signals and waveforms to one or more peer UE(s).

In another example, the determination of the propagation-to-RSRP relationship (f( )) may comprise determining a propagation time ($t_{pd}$) estimate based on a location of UE and a location of the peer UE (e.g., while synchronized). In one case, where the location of the peer UE is known at the UE using location information included as part of a sidelink transmission from the peer UE. Such a transmission may occur at a time prior to the transmission of the synchronization signal, or at the same time (e.g., as part of a sidelink data channel). A RSRP estimate of the received sidelink signal is then determined. One or more parameters of a propagation-to-RSRP relationship (f( )) are then determined which equate (or map) the measured RSRP with the propagation time ($t_{pd}$) estimate. In one example, where RSRP=f ($t_{pd}$), f( ) has the parametric form $f(t_{pd})=a*(t_{pd})^b$.

In another example, when synchronized, a quality of the synchronization between the peer UEs may be ascertained. In one example, the quality can be indicated (e.g., in sidelink synchronization signals) as a level between 0 and 1. For example, 1 can be used to designate high quality GNSS synchronization, where an expected timing error is small (e.g., less than 3 Ts, etc.). In another example, 0.5 can be used to designate lower quality GNSS synchronization, where an expected timing error is larger (e.g., less than 12 Ts, etc.). In some designs, the synchronization quality can be used as a weighting coefficient in the propagation-to-RSRP relationship (f( )).

In some designs, the propagation-to-RSRP relationship (f( )) may depend on the receive beam (e.g., spatial configuration of the receive beam). In this case, when synchronized, the propagation-to-RSRP relationship (f( )) is determined specific to a particular receive beam of the UE. Then, when unsynchronized, the propagation-to-RSRP relationship (f( )) is likewise used to determine the reference timing for that specific receive beam. For example, parameters (a,b) in the propagation-to-RSRP relationship (f( )) may be different based on whether a particular receive beam is LOS or NLOS. Specific recognition of whether a beam is LOS or NLOS is possible but not expressly required.

In some designs, the propagation delay parameter need not include the propagation-to-RSRP relationship (f( )) as described above. For example, when synchronized, a UE can estimate an arrival time of a sidelink synchronization signal from a SyncRef UE to determine a one-way propagation delay between the two UEs. It will be appreciated that there can sometimes be multiple SyncRef UEs, in which case the propagation delay can be estimated with respect to multiple SyncRef UEs. Then, when unsynchronized, the UE continues to receive the sidelink synchronization signals from the SyncRef UE(s) (e.g., some of which may stop transmitting the sidelink synchronization signal if out of coverage) and use the previously recorded propagation delay(s) to estimate the current propagation delay(s). So, while the above-noted propagation-to-RSRP relationship (f( )) relies upon a combination of old data and new data (e.g., the current RSRP), in this embodiment the 'old' propagation delay is simply re-used.

In further designs, the various operations described above with respect to FIGS. 9-10 may be implemented via various "means", such as particular hardware components of the associated UEs 905 and 1005. For example, means for performing the establishing aspects of 502, 504, 802 and 804 may correspond to any combination of transceiver-related circuitry on the respective UEs, such as antenna(s) 352, receiver(s) 354, RX processor 356, transmitter(s) 354, Tx processor 368, etc. of UE 350 of FIG. 3A. In a further example, means for performing the determining and estimating aspects of 904-908 and 1004-1008 may corresponding to any combination of processor-related circuitry on the respective UEs, such as controller/processor 359 of UE 350 of FIG. 3A.

While some of the embodiments are described above with respect to EN-DC mode, the various embodiments of the disclosure are also applicable with respect to other types of dual connectivity modes, such as such as NR-NR NR-LTE, etc. Moreover, while some of the embodiments are described with respect to specific numerologies (e.g., 15 kHz SCS), other embodiments may be directed to implementations whereby different numerologies are used (e.g., 30 kHz SCS, 60 kHz SCS, 120 kHz SCS, 240 kHz SCS, 480 kHz SCS, etc.).

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the various aspects described herein.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or other such configurations).

The methods, sequences, and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of non-transitory computer-readable medium known in the art. An exemplary non-transitory computer-readable medium may be coupled to the processor such that the processor can read information from, and write information to, the non-transitory computer-readable medium. In the alternative, the non-transitory computer-readable medium may be integral to the processor. The processor and the non-transitory computer-readable medium may reside in an ASIC. The ASIC may reside in a user device (e.g., a UE) or a base station. In the alternative, the processor and the non-transitory computer-readable medium may be discrete components in a user device or base station.

In one or more exemplary aspects, the functions described herein may be implemented in hardware, software, firmware, or any combination thereof. If implemented in software, the functions may be stored on or transmitted over as one or more instructions or code on a non-transitory computer-readable medium. Computer-readable media may include storage media and/or communication media including any non-transitory medium that may facilitate transferring a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of a medium. The term disk and disc, which may be used interchangeably herein, includes CD, laser disc, optical disc, DVD, floppy disk, and Blu-ray discs, which usually reproduce data magnetically and/or optically with lasers. Combinations of the above should also be included within the scope of computer-readable media.

While the foregoing disclosure shows illustrative aspects, those skilled in the art will appreciate that various changes and modifications could be made herein without departing from the scope of the disclosure as defined by the appended claims. Furthermore, in accordance with the various illustrative aspects described herein, those skilled in the art will appreciate that the functions, steps, and/or actions in any methods described above and/or recited in any method claims appended hereto need not be performed in any particular order. Further still, to the extent that any elements are described above or recited in the appended claims in a singular form, those skilled in the art will appreciate that singular form(s) contemplate the plural as well unless limitation to the singular form(s) is explicitly stated.

What is claimed is:

1. A method of operating a user equipment (UE), comprising:
 establishing, with a peer sidelink UE, at least one sidelink communications link that each comprises one or more hops;
 estimating, while the UE is unsynchronized with respect to a network clock, a propagation delay between the UE and the peer sidelink UE based in part upon a relationship between a propagation time, between the UE and the peer sidelink UE, and Reference Signal Received Power (RSRP); and
 determining, while the UE is unsynchronized with respect to the network clock, a reference timing based on the estimated propagation delay.

2. The method of claim 1, wherein the network clock is for a Global Navigation Satellite System (GNSS) or a terrestrial network.

3. The method of claim 1,
wherein the relationship is determined locally at the UE, or
wherein the relationship is crowdsourced from one or more other UEs, or
a combination thereof.

4. The method of claim 1, wherein the estimating estimates the propagation delay as a function of a current RSRP based on the relationship.

5. The method of claim 4, wherein the current RSRP is measured with respect to a sidelink synchronization signal.

6. The method of claim 1, wherein the relationship between the RSRP and the propagation time is based at least in part on measurement of a reference signal or a sidelink synchronization signal that occurs while the UE or another UE is synchronized with respect to the network clock.

7. A user equipment (UE), comprising:
means for establishing, with a peer sidelink UE, at least one sidelink communications link that each comprises one or more hops;
means for estimating, while the UE is unsynchronized with respect to a network clock, a propagation delay between the UE and the peer sidelink UE based in part upon a relationship between a propagation time, between the UE and the peer sidelink UE, and Reference Signal Received Power (RSRP); and
means for determining, while the UE is unsynchronized with respect to the network clock, a reference timing based on the estimated propagation delay.

8. The UE of claim 7, wherein the network clock is for a Global Navigation Satellite System (GNSS) or a terrestrial network.

9. The UE of claim 7,
wherein the relationship is determined locally at the UE, or
wherein the relationship is crowdsourced from one or more other UEs, or
a combination thereof.

10. The UE of claim 7, wherein the means for estimating estimates the propagation delay as a function of a current RSRP based on the relationship.

11. The UE of claim 10, wherein the current RSRP is measured with respect to a sidelink synchronization signal.

12. The UE of claim 7, wherein the relationship between the RSRP and the propagation time is based at least in part on measurement of a reference signal or a sidelink synchronization signal that occurs while the UE or another UE is synchronized with respect to the network clock.

13. A user equipment (UE), comprising:
a memory;
at least one transceiver; and
at least one processor coupled to the memory and the at least the transceiver, the at least one processor configured to:
establish, with a peer sidelink UE, at least one sidelink communications link that each comprises one or more hops;
estimate, while the UE is unsynchronized with respect to a network clock, a propagation delay between the UE and the peer sidelink UE based in part upon a relationship between a propagation time, between the UE and the peer sidelink UE, and Reference Signal Received Power (RSRP); and
determine, while the UE is unsynchronized with respect to the network clock, a reference timing based on the estimated propagation delay.

14. The UE of claim 13, wherein the network clock is for a Global Navigation Satellite System (GNSS) or a terrestrial network.

15. The UE of claim 13,
wherein the relationship is determined locally at the UE, or
wherein the relationship is crowdsourced from one or more other UEs, or
a combination thereof.

16. The UE of claim 13, wherein the at least one processor is configured to estimate the propagation delay as a function of a current RSRP based on the relationship.

17. The UE of claim 16, wherein the current RSRP is measured with respect to a sidelink synchronization signal.

18. The UE of claim 13, wherein the relationship between the RSRP and the propagation time is based at least in part on measurement of a reference signal or a sidelink synchronization signal that occurs while the UE or another UE is synchronized with respect to the network clock.

19. A non-transitory computer-readable medium containing instructions stored thereon, which, when executed by a user equipment (UE), cause the UE to perform actions, the instructions comprising:
at least one instruction configured to cause the UE to establish, with a peer sidelink UE, at least one sidelink communications link that each comprises one or more hops;
at least one instruction configured to cause the UE to estimate, while the UE is unsynchronized with respect to a network clock, a propagation delay between the UE and the peer sidelink UE based in part upon a relationship between a propagation time, between the UE and the peer sidelink UE, and Reference Signal Received Power (RSRP); and
at least one instruction configured to cause the UE to determine, while the UE is unsynchronized with respect to the network clock, a reference timing based on the estimated propagation delay.

20. The non-transitory computer-readable medium of claim 19, wherein the network clock is for a Global Navigation Satellite System (GNSS) or a terrestrial network.

21. The non-transitory computer-readable medium of claim 19,
wherein the relationship is determined locally at the UE, or
wherein the relationship is crowdsourced from one or more other UEs, or
a combination thereof.

22. The non-transitory computer-readable medium of claim 19, wherein the at least one instruction configured to cause the UE to estimate causes the UE to estimate the propagation delay as a function of a current RSRP based on the relationship.

23. The non-transitory computer-readable medium of claim 22, wherein the current RSRP is measured with respect to a sidelink synchronization signal.

24. The non-transitory computer-readable medium of claim 19, wherein the relationship between the RSRP and the propagation time is based at least in part on measurement of a reference signal or a sidelink synchronization signal that occurs while the UE or another UE is synchronized with respect to the network clock.

* * * * *